(12) United States Patent
Daisuke et al.

(10) Patent No.: US 8,157,322 B2
(45) Date of Patent: Apr. 17, 2012

(54) SEAT BACK ASSEMBLY WITH LOW DENSITY FRAME

(75) Inventors: Itoh Daisuke, Ann Arbor, MI (US); Lindsay Anne-Allor Babian, Canton, MI (US); Shelley Bridget Szalay, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 283 days.

(21) Appl. No.: 12/340,814

(22) Filed: Dec. 22, 2008

(65) Prior Publication Data

US 2010/0156163 A1    Jun. 24, 2010

(51) Int. Cl.
*B60N 2/42* (2006.01)

(52) U.S. Cl. .............. 297/216.13; 297/452.18; 296/68.1

(58) Field of Classification Search ............. 297/452.18, 297/216.13; 280/748, 751; 296/68.1
See application file for complete search history.

(56) References Cited

U.S. PATENT DOCUMENTS

| | | | |
|---|---|---|---|
| 3,511,535 A | 5/1970 | Gunlock | |
| 4,109,959 A | 8/1978 | Barecki et al. | |
| 4,568,124 A | 2/1986 | Kanai | |
| 5,468,053 A | 11/1995 | Thompson et al. | |
| 5,542,747 A | 8/1996 | Burchi | |
| 5,676,423 A | 10/1997 | Pedronno et al. | |
| 5,786,394 A | 7/1998 | Slaven | |
| 5,951,110 A | 9/1999 | Conner et al. | |
| 5,988,757 A | 11/1999 | Vishey et al. | |
| 6,003,937 A | 12/1999 | Dutton et al. | |
| 6,027,171 A | 2/2000 | Partington et al. | |
| 6,213,557 B1 | 4/2001 | Aebischer et al. | |
| 6,409,269 B1 | 6/2002 | Aebischer et al. | |
| 6,491,346 B1 | 12/2002 | Gupta et al. | |
| 6,679,550 B2 * | 1/2004 | Goor et al. ........... | 297/216.11 X |
| 6,733,064 B2 | 5/2004 | Fox et al. | |
| 7,137,670 B2 | 11/2006 | Gupta et al. | |
| 7,290,837 B2 | 11/2007 | Sugiyama et al. | |
| 2003/0116993 A1 | 6/2003 | Skarb et al. | |
| 2004/0084937 A1 | 5/2004 | Berta | |
| 2005/0146190 A1 | 7/2005 | Taatjes | |
| 2005/0173903 A1 | 8/2005 | Mellor | |
| 2008/0018162 A1 | 1/2008 | Galbreath et al. | |
| 2008/0042482 A1 | 2/2008 | Weiss et al. | |
| 2008/0145635 A1 | 6/2008 | Stoll et al. | |

* cited by examiner

*Primary Examiner* — Anthony D Barfield
(74) *Attorney, Agent, or Firm* — Gifford, Krass, Sprinkle, Anderson & Citkowski, P.C.

(57) ABSTRACT

A seat back assembly including a frame molded from expanded polypropylene (EPP). The expanded polypropylene frame includes a first surface and a second surface. The EPP frame is molded so as to include at least one standoff. The standoff extends outwardly from the second surface into a contact surface. The contact surface is registered to engage a vehicle body structure. Thus when the seat back experiences a frontal load, the frontal load is transformed so as to compress the standoff, and also transfers a load to the vehicle body structure. The EPP frame may also be molded so as to encapsulate an armrest bracket for attaching a pivotable armrest, or attachment wires to secure the seat back assembly to the vehicle body. The EPP frame may also be molded to include a headrest.

16 Claims, 8 Drawing Sheets

SEAT BACK ASSEMBLY WITH LOW DENSITY FRAME

FIELD OF THE INVENTION

The present invention is related to a seat back assembly having a frame molded from expanded polypropylene and having a standoff registered to engage a vehicle body structure.

BACKGROUND OF THE INVENTION

Mass reduction in vehicle parts and components lowers the rate of the vehicle's fuel consumption. Thus different materials are considered to form vehicle structure which may be lighter in weight than steel or metal, but yet provide the sufficient structural strength for body support. In particular, it is known to replace metal frames for vehicle components such as seat assemblies with polyurethane, or polypropylene.

Polypropylene has sufficient compression and tensile strength to replace the metal in the manufacture of the seat back assembly flame. Indeed, some vehicle seat backs have done so. Expanded polypropylene (EPP) is generally polypropylene that has been expanded using gas injection during the molding process. EPP has a lower density than polypropylene and thus weighs less than the same volume of polypropylene. Accordingly, it remains desirable to reduce the mass of a seat back assembly by using a frame than is lighter than metal, but yet has sufficient structural integrity so as to withstand the load associated with vehicle operation.

Seat back assemblies contain numerous parts. For instance, a seat back assembly with a pivotable armrest requires a bracket for which the armrest pivots about. The bracket must be further fixed to the seat back assembly. It is known to fix the armrest bracket to the metal frame. This increases production costs as the armrest bracket must be welded to the frame. Further, the armrest bracket must have a planar surface large enough to apply the spot welder to. Thus it remains desirable to have a seat back assembly that requires less mass than that of the prior art seat back assemblies, but yet retains comfort features such as an armrest, headrest, and the like.

SUMMARY OF THE INVENTION AND ADVANTAGES

A seat back assembly including a frame molded from expanded polypropylene (EPP), and a headrest integrally formed with the frame. The expanded polypropylene frame includes a first surface and a second surface. A cushion body is mounted onto the first surface. The seat back assembly is also molded to include a standoff. The standoff extends outwardly from the second surface into a contact surface. The contact surface is registered to engage a vehicle body structure when the seat back experiences a frontal load so as to transform the frontal load to compress the standoff, and wherein the standoff further transfers a load to the vehicle body structure.

The seat back assembly further includes other structure encapsulated within the EPP frame, to include a pair of attachment wires. Each of the attachment wires includes a base portion and a hook portion. The base portion is encapsulated within the expanded polypropylene frame and the hook portion protrudes from the EPP frame so as to secure the seat back assembly to the vehicle body.

An armrest bracket is also encapsulated within the EPP frame. The armrest bracket includes a first portion and a second portion. The first portion is encapsulated within the EPP frame so as to transfer a load placed on the armrest bracket along the first portion and into the EPP frame. The second portion is configured to pivotably hold an armrest.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
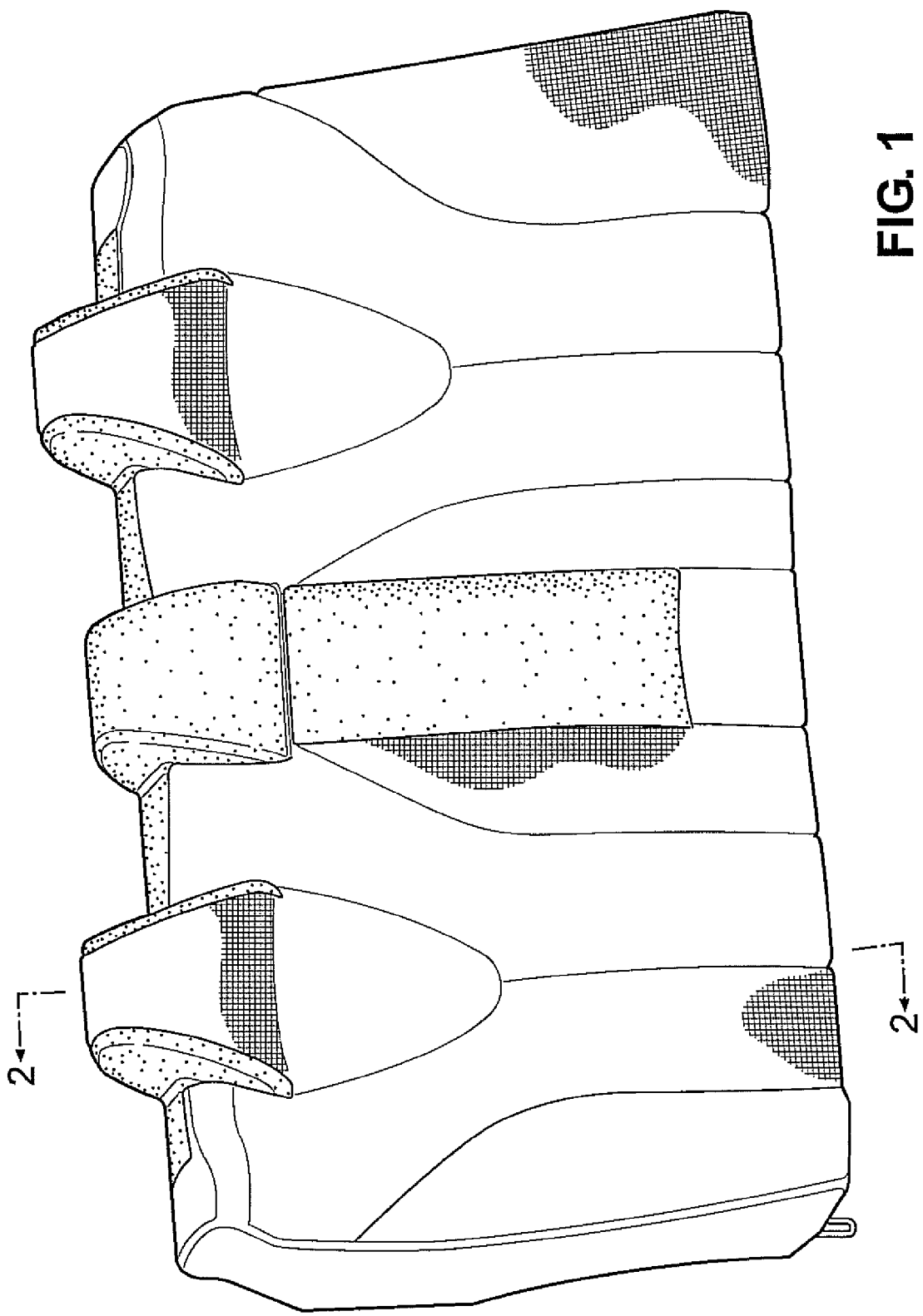
FIG. 1 is a view taken from the front of the seat back assembly according to an embodiment of the present invention, the seat back assembly includes a frame made of EPP, a cushion body mounted onto the frame, a trim cover fitted over the cushion body, and a pivotable armrest is in a stowed position.
Figure 2:
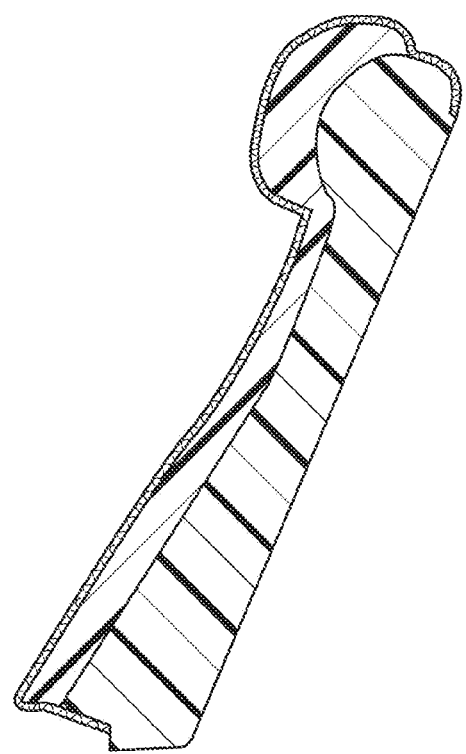
FIG. 2 is shows the cross-section of FIG. 1 taken along lines 2-2.

Referring to the Figures, wherein like numerals indicate corresponding parts throughout the several views, a seat back assembly 10 including a frame 12 formed of a low density material such as expanded polypropylene (EPP) is provided. Expanded polypropylene has a lower density than conventional frame 12 material such as polypropylene and metal. The seat back assembly 10 may further include a cushion body 14 mounted onto the EPP frame 12 so as to provide comfort, and a trim cover 16 fitted over the cushion for aesthetics, as shown in FIG. 1. A cross section of the seat back assembly 10 is provided in FIG. 2 to show the different layers. The seat back assembly 10 includes standoffs 18 so as to transfer a frontal load to a vehicle body structure 20 and transform the frontal load into the compression of the standoffs 18. The standoffs 18 of the EPP frame 12 provide rigid support for the occupant, and the EPP reduces fuel consumption because of its low density.

The EPP frame 12 may be molded in a clam shell mold, using known molding techniques. The molded EPP frame 12 includes a first surface 22 and a second surface 24, also referenced herein as a front surface 22 and a rear surface 24.

A center portion 23 is between the front and rear surfaces 22, 24. The cushion 14 is mounted to the second surface 24, and the second surface 24 is molded so as to include at least one standoff 18.

Figure 3:
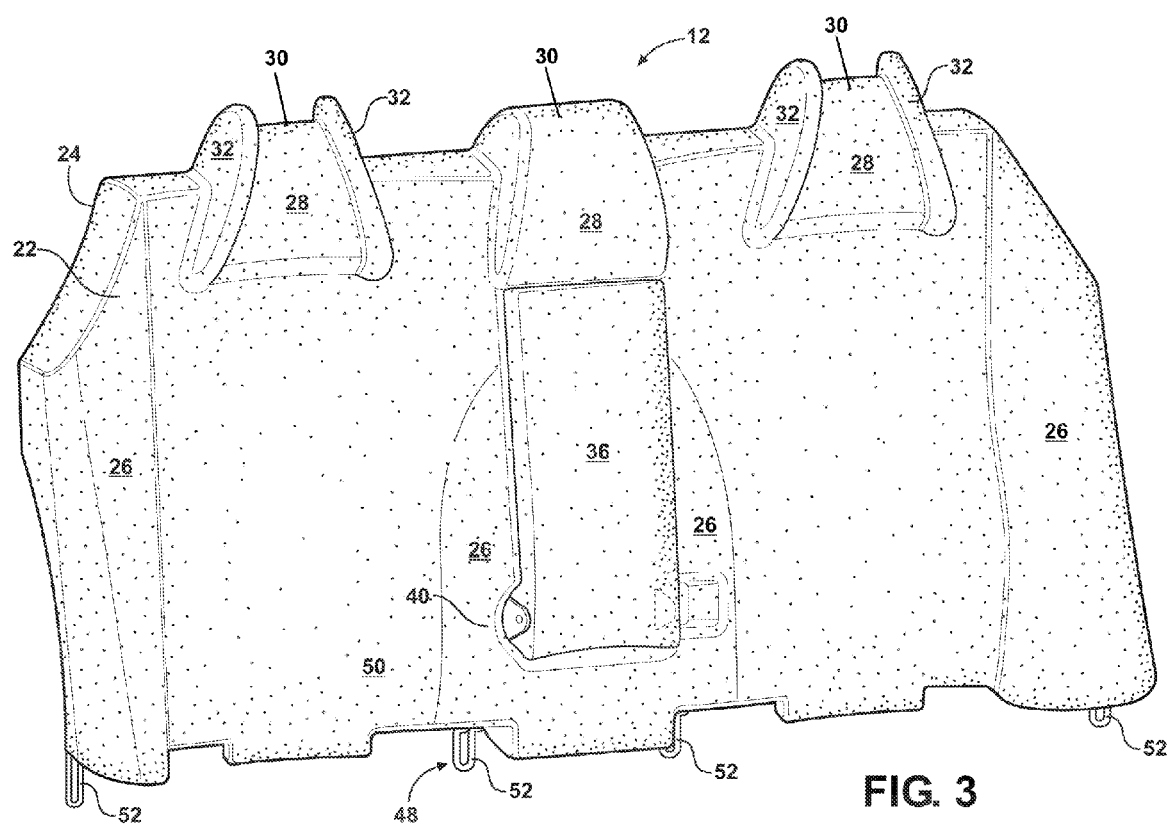
FIG. 3 view of FIG. 1 showing the seat back assembly without the cushion body or trim cover, the figure also includes a hidden view of the armrest bracket and a portion of the attachment wires both encapsulated within the EPP frame, thus minimal parts are need to support the armrest and attachment wires.

With reference now to FIG. 3, the EPP frame 12 may be contoured to accommodate the natural contours of a human back, and include other features for occupant support. For instance, the EPP frame 12 may be molded so as to have side bolsters 26. The EPP frame 12 may also be molded so as to form an integral headrest 28. The headrest 28 includes a head support body 30 and a pair of flanges 32 extending radially from the head support body 30. The flanges provide support for a head cushion.

Figure 4:
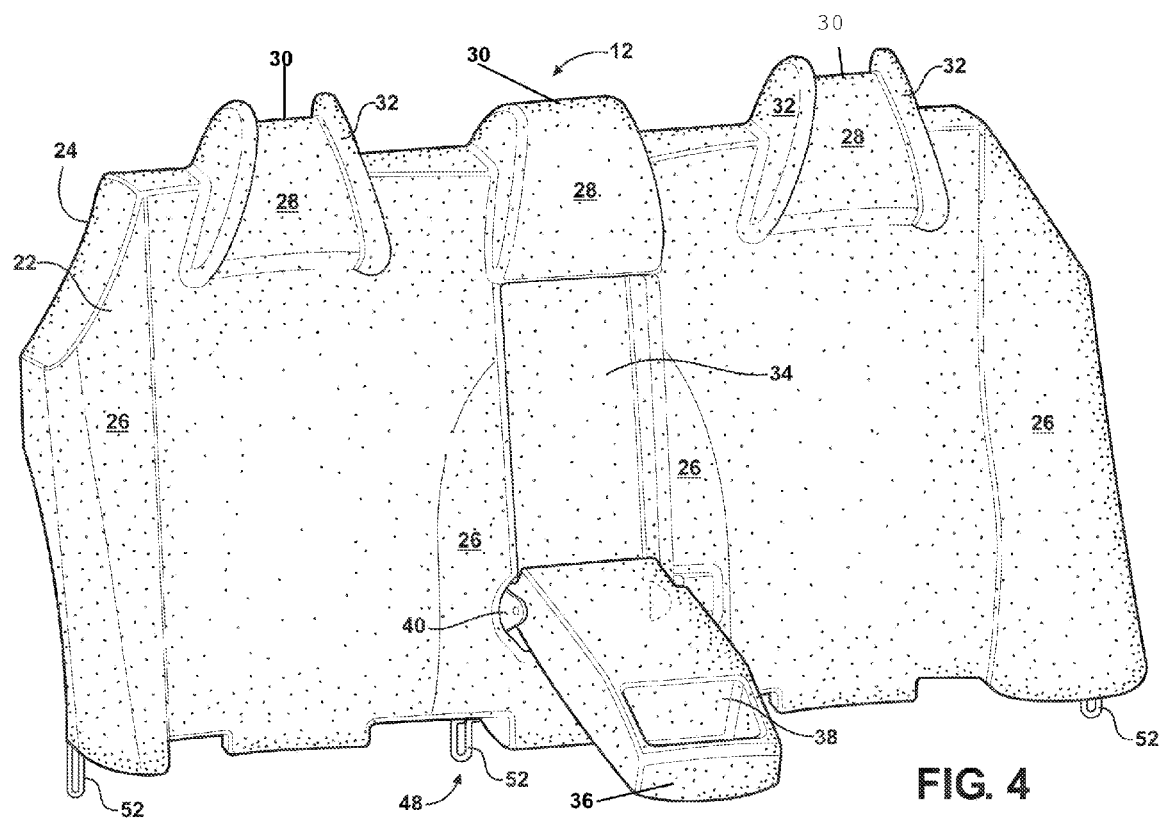
FIG. 4 is a view of FIG. 3 showing the pivotable armrest in the use position.

The EPP frame 12 may further include an armrest compartment 34 configured so as to store an armrest 36. Preferably the armrest 36 is also formed of EPP and is pivotably attached to the armrest 36 frame 12 and may also be cushioned and covered with a trim cover 16. The armrest 36 may be molded so as to include a storage compartment 38 for articles such as coins. The armrest 36 is movable between a use position, as shown in FIG. 4 and a stowed position as shown in FIG. 3. When the armrest 36 is in the stowed position, the body of the armrest 36 is nestled within the compartment and when the armrest 36 is in the use position the storage compartment 38 is accessible.

Figure 5:
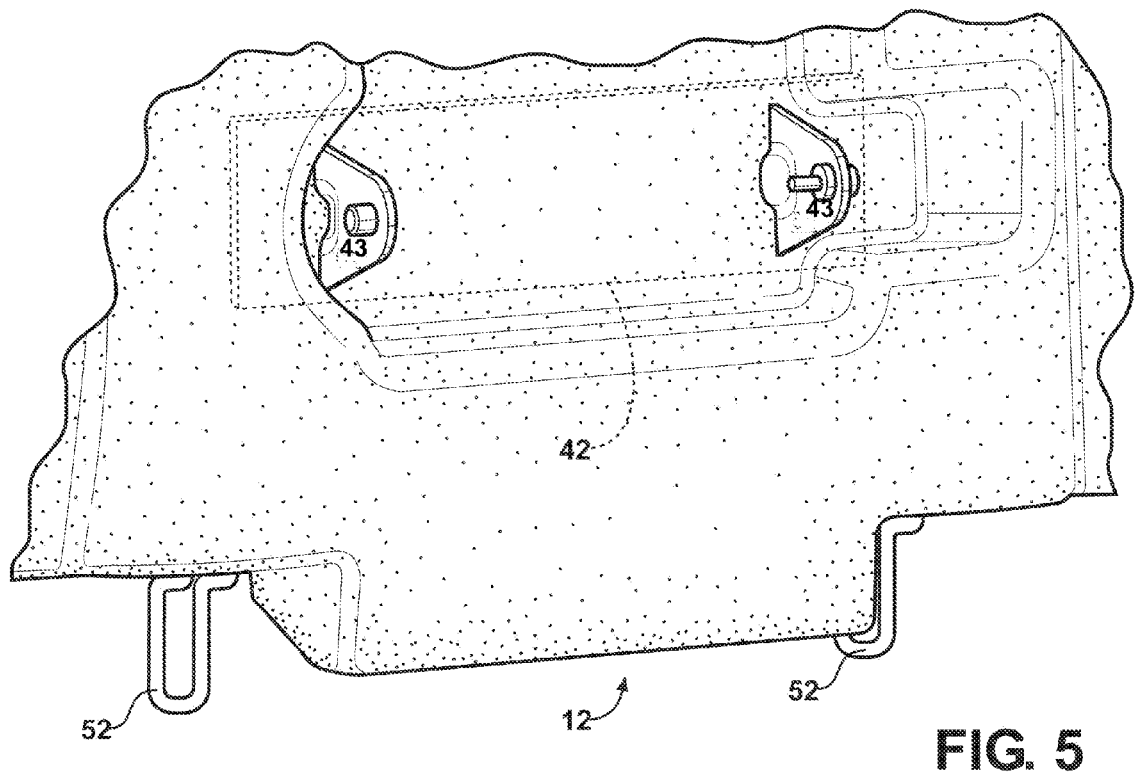
FIG. 5 is an isolated view of the armrest bracket, a portion of the armrest bracket is encapsulated within the EPP frame (seen by the dashed lines), while the mounting portion, which is configured to pivotably fix the armrest, is exposed.
Figure 5A:
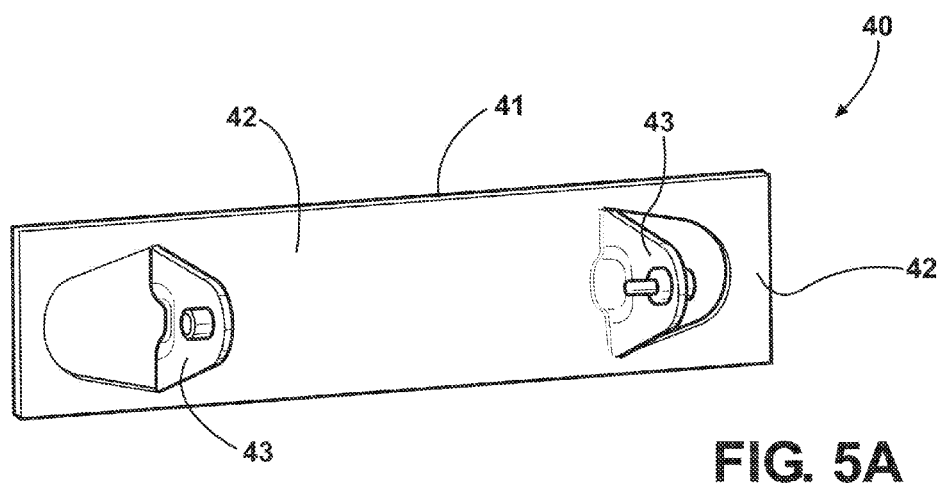

With now to FIGS. 5 and 5a, an armrest bracket 40 encapsulated within the EPP frame 12 is illustrated. The armrest bracket 40 has plate 41 presenting a planar surface 42 in contact with the EPP frame 12 so as to transfer a load placed on the armrest bracket 40 along the planar surface 42 and into the EPP frame 12, and an armrest 36 pivotably attached to the armrest bracket 40. The armrest bracket 40 includes a mounting portion 43 integral to the planar surface 42. The mounting portion 43 is exposed so as to be able to receive the armrest bracket 40.

Figure 6:
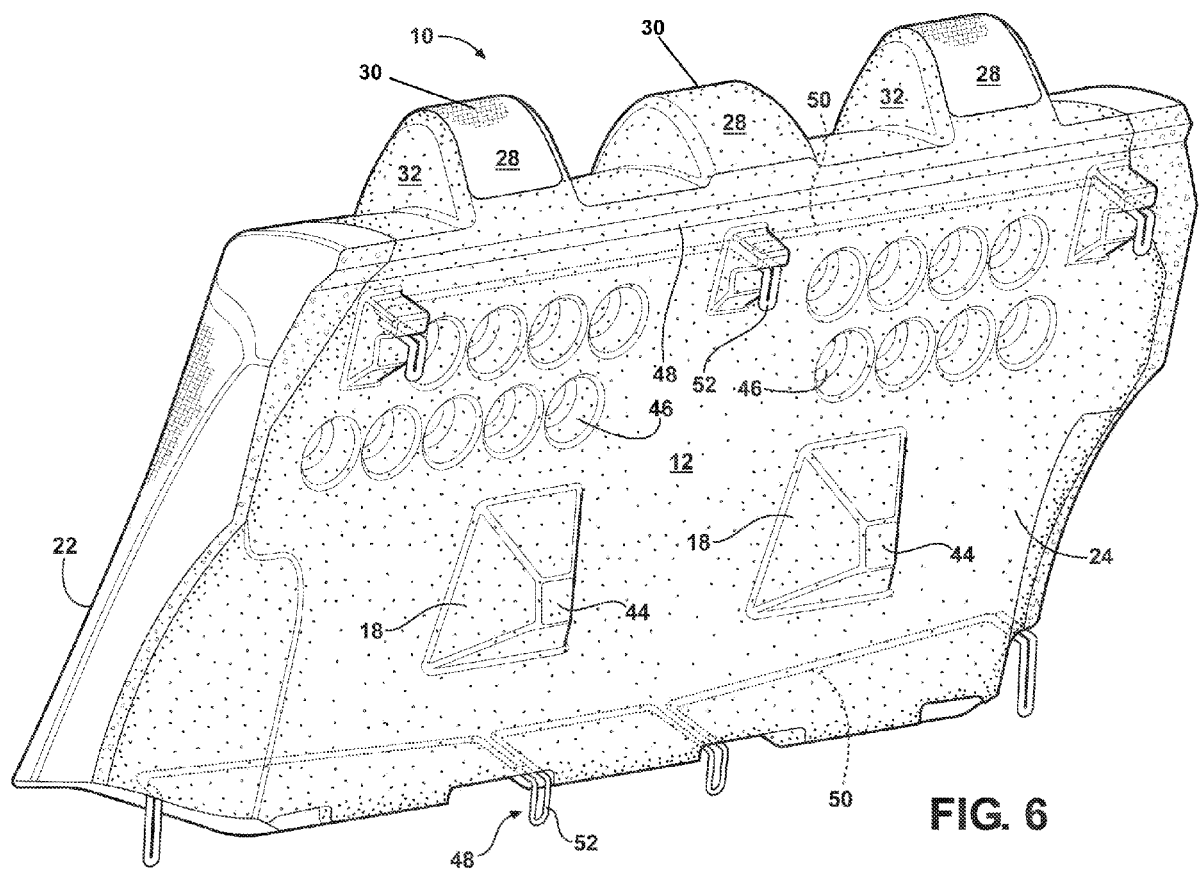
FIG. 6 is a view taken from the back of the seat back assembly showing the contact surfaces of the standoffs, and cutouts.
Figure 7:
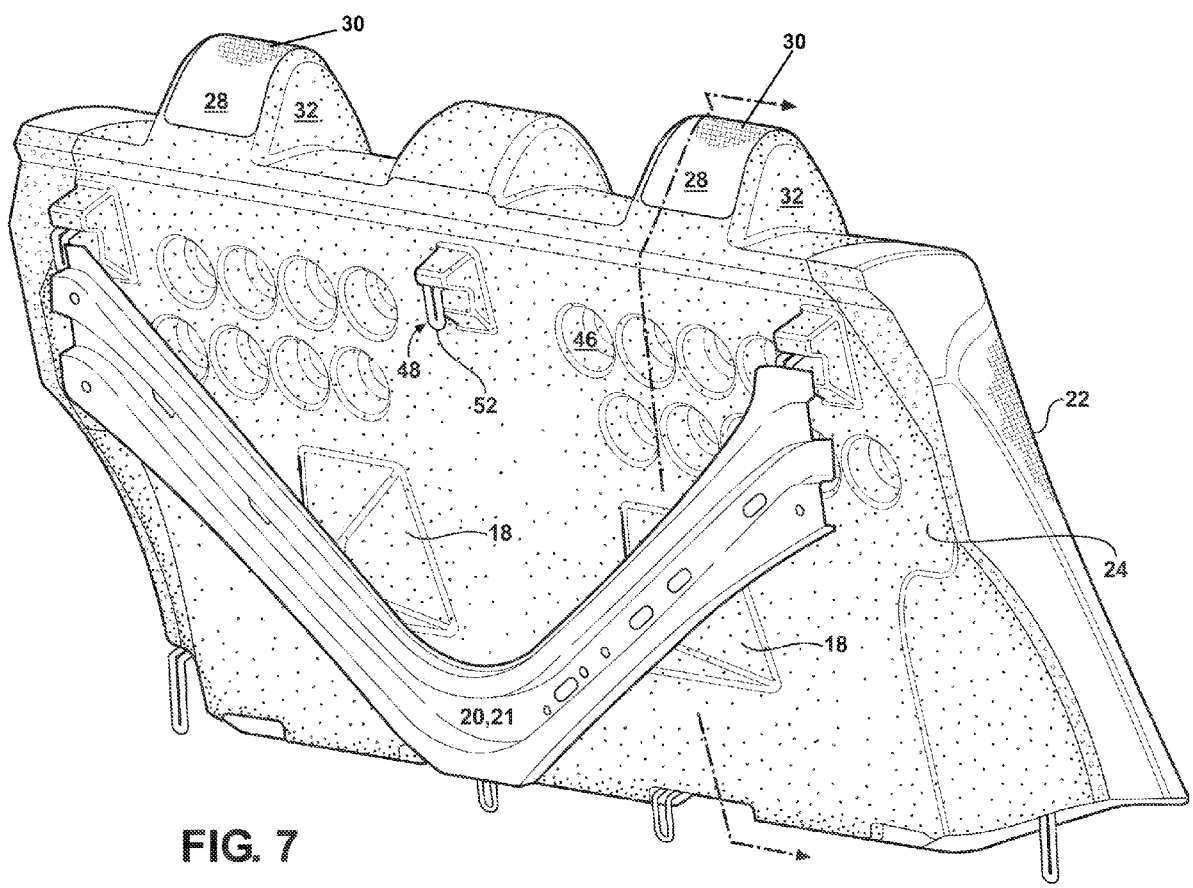
FIG. 7 is a view of an embodiment of the standoff and reinforcement structure, as shown the standoff is registered to engage the reinforcement structure when the seat back assembly experiences a frontal load.

With reference now to FIG. 6, the standoff 18 extends outwardly from the second surface 24 into a contact surface 44. The seat back assembly 10 may further include cut-outs 46 so as to reduce the mass of the seat back assembly 10. With reference now to FIG. 7, the contact surface 44 is registered to engage a vehicle body structure 20 when the seat back experiences a frontal load so as to transform the frontal load into compression. Meaning, when a load coming from the front of the vehicle impacts the seat back assembly 10, the seat back assembly 10 is pushed backwards such that the contact surface 44 of the standoff 18 engages the vehicle body structure 20. The standoff 18 also transfers the frontal load to the vehicle body structure 20.

Figure 8:
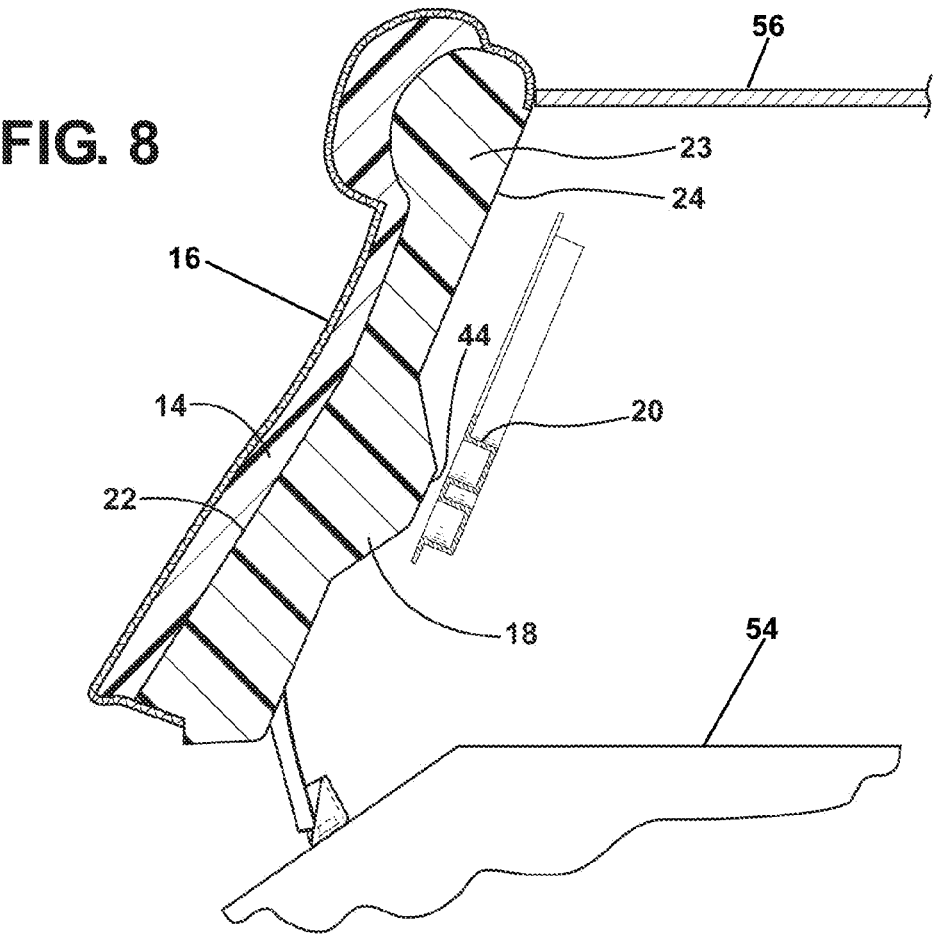
FIG. 8 is a view of the seat back assembly secured to the trunk of the vehicle, the second surface of the EPP frame defines a trunk wall.

With reference now to FIG. 8, the seat back assembly 10 may be mounted onto the back of the vehicle to form the rear seats. Thus, the second surface 24 of the seat back assembly 10 forms a wall defining the interior trunk space. With reference again to FIG. 6, the seat back assembly 10 may further include at least one attachment wire 48. The attachment wire 48 has a base portion 50 and a hook portion 52. The base portion 50 is encapsulated within the EPP frame 12 and the hook portion 52 protrudes from the EPP frame 12 so as to secure the seat back assembly 10 to the vehicle body. Specifically, one of the attachment wires 48 is configured to secure the seat back assembly 10 to the floor of the vehicle's trunk, while the other attachment wire 48 is configured to secure the seat back assembly 10 to the upper back panel.

As stated above, the seat back assembly 10 is secured to the vehicle such that the standoff 18 is registered to engage a vehicle body structure 20, particularly a reinforcement structure 21 of the vehicle body. The reinforcement structure 21 may be a bar extending between the trunk floor 54 and the trunk ceiling 56, or may extend transversally across the trunk between the rear wheel wells (not shown). For illustrative purposes, the reinforcement structure 21 is shown as a generally "V" shaped frame 12 and wherein the standoff 18 is also generally "V" shaped. The reinforcement structure 21 is secured to the vehicle body at both ends so as to transfer load throughout the vehicle body.

Figure 9:
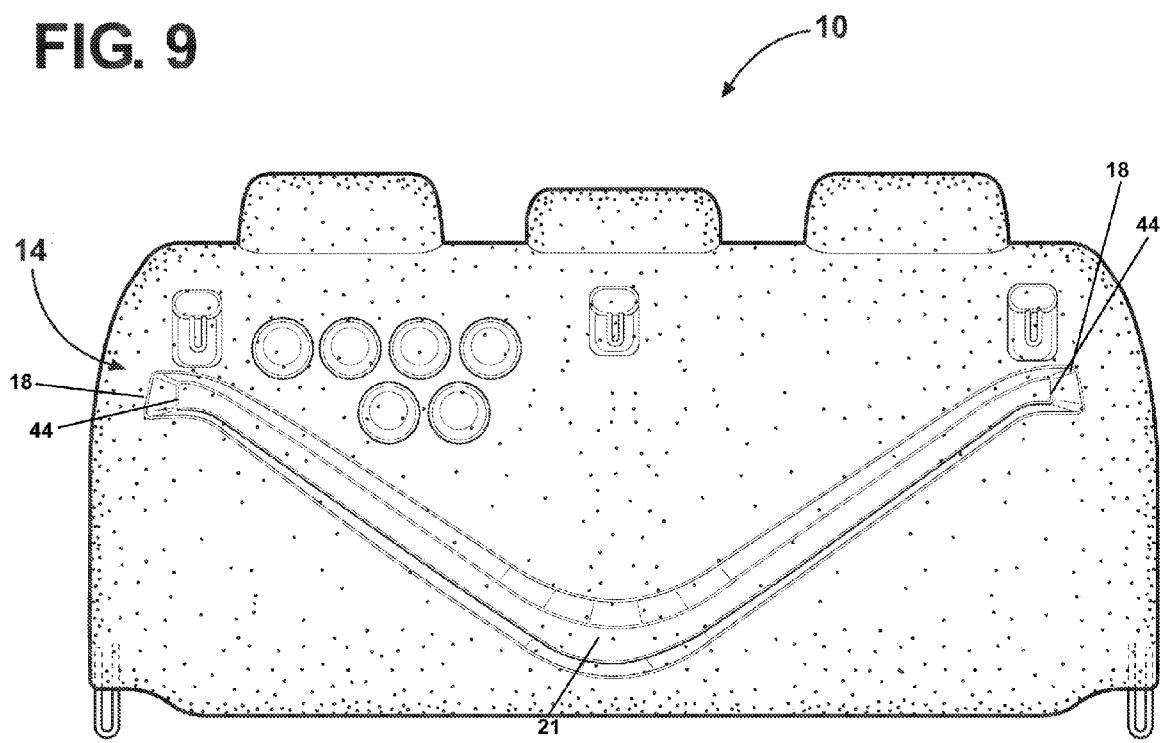
FIG. 9 is a view of another embodiment of the standoff, wherein the standoff has a shape complimentary with the shape of the vehicle reinforcement structure.

As shown in FIG. 9, the standoff 18 may have a shape complimentary with the shape of the reinforcement structure 21. Thus, the contact surface 44 of the standoff 18 be pressed against the reinforcement structure 21 under a predetermined frontal load such that the contact surface 44 is generally flush against the reinforcement structure 21.

Obviously, many modifications and variations of the present invention are possible in light of the above teachings and may be practiced otherwise than as specifically described while within the scope of the appended claims.

What is claimed is:

1. A seat back assembly having a cushion body covered with a trim cover, the seat back assembly comprising:
a frame formed of expanded polypropylene, the expanded polypropylene frame including a front surface, a rear surface, and a center portion between the front and rear surfaces, wherein the cushion body is mounted onto the front surface;
a standoff disposed on the rear surface, the standoff extending outwardly from the center portion and including a contact surface, the contact surface spaced apart from the rear surface, the contact surface positioned to engage a vehicle body structure when the seat back experiences a frontal load so as to transform the frontal load into compression, and wherein the standoff further transfers a load to the vehicle body structure.

2. The seat back assembly as set forth in claim 1, further comprising: an armrest bracket encapsulated within the expanded polypropylene frame, the armrest bracket including a planar surface in contact with the expanded polypropylene frame so as to transfer a load placed on the armrest bracket along the planar surface and into the expanded polypropylene frame; and an armrest pivotably attached to the armrest bracket.

3. The seat cushion assembly as set forth in claim 1, wherein the expanded polypropylene frame is contoured so as to fittingly engage a contour of a human back.

4. The seat cushion assembly as set forth in claim 1, further comprising a headrest integrally formed from the expanded polypropylene frame.

5. The seat cushion assembly as set forth in claim 4, wherein the headrest includes a head support body and a pair of flanges extending radially from the head support body, wherein each of the pair of flanges are spaced apart from the other and are disposed on opposite ends of the head support body.

6. The seat back assembly as set forth in claim 2, wherein the expanded polypropylene frame further includes an armrest compartment configured so as to store the armrest such that the exterior surface of the armrest is flush with the front surface of the seat back assembly.

7. The seat back assembly as set forth in claim 1, further including a pair of side bolsters, each of said pair of side bolsters integrally formed on opposite sides of the seat back assembly.

8. The seat back assembly as set forth in claim 1, wherein the vehicle body structure is a reinforcement structure, and wherein the standoff has a shape complimentary with the shape of the reinforcement structure such that the contact surface of the standoff is generally flush against the reinforcement structure under a predetermined frontal load.

9. The seat back assembly as set forth in claim 8, wherein the reinforcement structure is a generally "V" shaped frame and wherein the standoff is also generally "V" shaped.

10. The seat back assembly as set forth in claim 8, wherein opposite ends of the reinforcement structure are secured to the vehicle body.

11. The seat back assembly as set forth in claim 1, further comprising at least one cut-out so as to reduce mass.

12. The seat back assembly as set forth in claim 1, further comprising at least one attachment wire having a base portion and a hook portion, wherein the base portion is encapsulated within the expanded polypropylene frame and the hook portion protrudes from the expanded polypropylene frame so as to secure the seat back assembly to the vehicle body.

13. A seat back assembly having a cushion body covered with a trim cover, the seat cushion assembly comprising:
   a frame formed of expanded polypropylene, the expanded polypropylene frame including a front surface and a rear surface, and wherein the cushion body is mounted onto the front surface;
   a headrest integrally formed with the frame, the headrest includes a head support body and a pair of flanges extending radially from the head support body, wherein each of the pair of flanges are spaced apart from the other and are disposed on opposite ends of the head support body;
   at least one attachment wire having a base portion and a hook portion, wherein the base portion is encapsulated within the expanded polypropylene frame and the hook portion protrudes from the expanded polypropylene frame so as to secure the seat back assembly to the vehicle body;
   an armrest bracket encapsulated within the expanded polypropylene frame, the armrest bracket including a planar surface in contact with the expanded polypropylene frame so as to transfer a load placed on the armrest bracket along the planar surface and into the expanded polypropylene frame; and
   an armrest pivotably attached to, the armrest bracket; and
   a standoff disposed on the rear surface, the standoff extending outwardly from the rear surface and including a contact surface, the contact surface registered to engage a vehicle body structure when the seat back experiences a frontal load so as to transform the frontal load to compress the standoff, and wherein the standoff further transfers a load to the vehicle body structure.

14. A seat back assembly having a cushion body covered with a trim cover and configured to enclose a trunk of a vehicle, the trunk including a reinforcement structure, the seat back assembly comprising:
   a frame formed of expanded polypropylene, the expanded polypropylene frame including a front surface and a rear surface, and wherein the cushion body is mounted onto the front surface;
   a pair of attachment wires encapsulated within the expanded polypropylene frame, wherein one of the pair of attachment wires attaches the seat back assembly to a ceiling of the trunk, and the other of the pair of attachment wires attaches the seat back assembly to the floor of the trunk;
   a standoff disposed on the rear surface, the standoff extending outwardly from the rear surface and including a contact surface, the contact surface registered to engage the reinforcement structure of the trunk when the seat back experiences a frontal load so as to transform the frontal load into compression, and wherein the standoff further transfers a load to the vehicle body structure.

15. A seat back assembly having a cushion body covered with a trim cover, the seat cushion assembly comprising:
   a frame molded of a low density material, the frame including a front surface and a rear surface, and wherein the cushion body is mounted onto the front surface;
   a standoff integrally molded on the rear surface, the standoff extending outwardly from the rear surface and including a contact surface, the contact surface spaced apart from the rear surface and exposed, the contact surface registered to engage a vehicle body structure when the seat back experiences a frontal load so as to transform the frontal load into compression, and wherein the standoff further transfers a load to the vehicle body structure.

16. A seat back assembly as set forth in claim 15, wherein the low density frame material is one selected from the group consisting of expanded polypropylene, expanded polyethylene, and expanded polyurethane.

* * * * *

UNITED STATES PATENT AND TRADEMARK OFFICE
CERTIFICATE OF CORRECTION

PATENT NO. : 8,157,322 B2  
APPLICATION NO. : 12/340814  
DATED : April 17, 2012  
INVENTOR(S) : Itoh Daisuke et al.

Page 1 of 1

It is certified that error appears in the above-identified patent and that said Letters Patent is hereby corrected as shown below:

In the Specifications:

At column 1, line number 22, delete "flame", insert --frame--.

At column 1, line number 28, delete "than", insert --that--.

At column 2, line number 17, delete "is".

At column 2, line number 19, after FIG. 3, insert --is a--.

At column 2, line number 23, delete "need", insert --needed--.

At column 2, line number 35, after shown, insert --,--.

At column 3, line number 17, delete "armrest 36".

At column 4, line number 10, after 18, insert --can--.

Signed and Sealed this  
Twenty-fifth Day of September, 2012

David J. Kappos  
*Director of the United States Patent and Trademark Office*